United States Patent [19]
Reinecke et al.

[11] 3,773,366
[45] Nov. 20, 1973

[54] ANTISKID DEVICE FOR CAR WHEELS ESPECIALLY FOR ROAD VEHICLES

[75] Inventors: Erich Reinecke, Beinhorn; Fritz Isernhagen, Letter; Alfred Klatt, Wettbergen; Erwin Holthusen, Itzehoe, all of Germany

[73] Assignee: Westinghouse Bremsen-Und Apparatebau GmbH, Hannover, Germany

[22] Filed: Jan. 17, 1972

[21] Appl. No.: 218,134

[30] Foreign Application Priority Data
Jan. 18, 1971 Germany.................. P 21 02 142.1

[52] U.S. Cl. .............................................. 303/21 F
[51] Int. Cl. ............................................... B60t 8/08
[58] Field of Search ............... 188/181 A; 303/21 F, 303/21 CF, 21 LG

[56] References Cited
UNITED STATES PATENTS
3,411,835  11/1968  Davis ....................... 188/181 A X

*Primary Examiner*—Duane A. Reger
*Attorney*—Ralph W. McIntire, Jr.

[57] ABSTRACT

Anti-skid apparatus for vehicle wheels, particularly street vehicles, including a braking pressure control valve device which modulates the braking pressure as a function of specified values of a magnitude indicating the skid threshold of the wheels in response first, to release of braking pressure and subsequently to restoration of braking pressure, and throttle means with a movable throttle member for delaying the rate of build-up of braking pressure during the restoration phase.

11 Claims, 6 Drawing Figures

ANTISKID DEVICE FOR CAR WHEELS ESPECIALLY FOR ROAD VEHICLES

BACKGROUND OF THE INVENTION

In some of the known anti-skid apparatus of the general herein considered type, the throttle means is effective only in the last stage of restoration of braking pressure and remains effective until braking pressure has been completely restored. This type of apparatus is objectionable in that the wheel is initially rapidly braked following complete restoration of braking pressure, thereby hastening the tendency toward a subsequent skid threshold without obtaining maximum utilization of the braking pressure.

In another known anti-skid apparatus of the general herein considered type, the throttle remains constantly in a throttling position so that it is necessary to provide additional control means in order to supply air pressure to the braking cylinder in bypassing relation to the throttle means during normal rotation of the wheel.

In still another anti-skid device of the general herein considered type, the means for actuating the throttle means is very expensive from the standpoint of construction and switching engineering.

SUMMARY OF THE INVENTION

The invention has the purpose of providing anti-skid apparatus of the type mentioned above in which the throttle is characterized by simplicity of structure and which can be automatically restored to an ineffective position when a specified, adjustable braking pressure compatible with normal wheel rotation is achieved. This task is solved according to the invention in which the throttle means includes a throttle piston, which, in the throttling position, is subjected on one side to pressure on the supply side of the throttle and on the other side to pressure on the delivery side of the throttle, such that the resultant force of pressure differential thus established is directed against the force of a return spring by which the throttle piston can be restored from the throttling position to a non-throttling position when the force of the spring overcomes the opposing dissipating differential pressure force. In order to improve the capacity of the wheel to utilize the braking force more efficiently at the end of the restoration phase of braking pressure, the apparatus, according to the invention, is provided with a return spring of such compression rating that the force thereof overcomes the opposing differential force of pressure acting on the throttle piston before the restoration of braking pressure is completed. In order to simplify control of the interaction of the throttle means with braking pressure within the braking pressure control valve device, another modification of the invention, is provided with a movable throttle member that is moved by the braking pressure control valve mechanism into the throttling position before the start of braking pressure restoration.

Other characteristics of the invention will become apparent when the detailed description thereof is considered in conjunction with the drawings in which.

DESCRIPTION AND OPERATION

Figure 1:
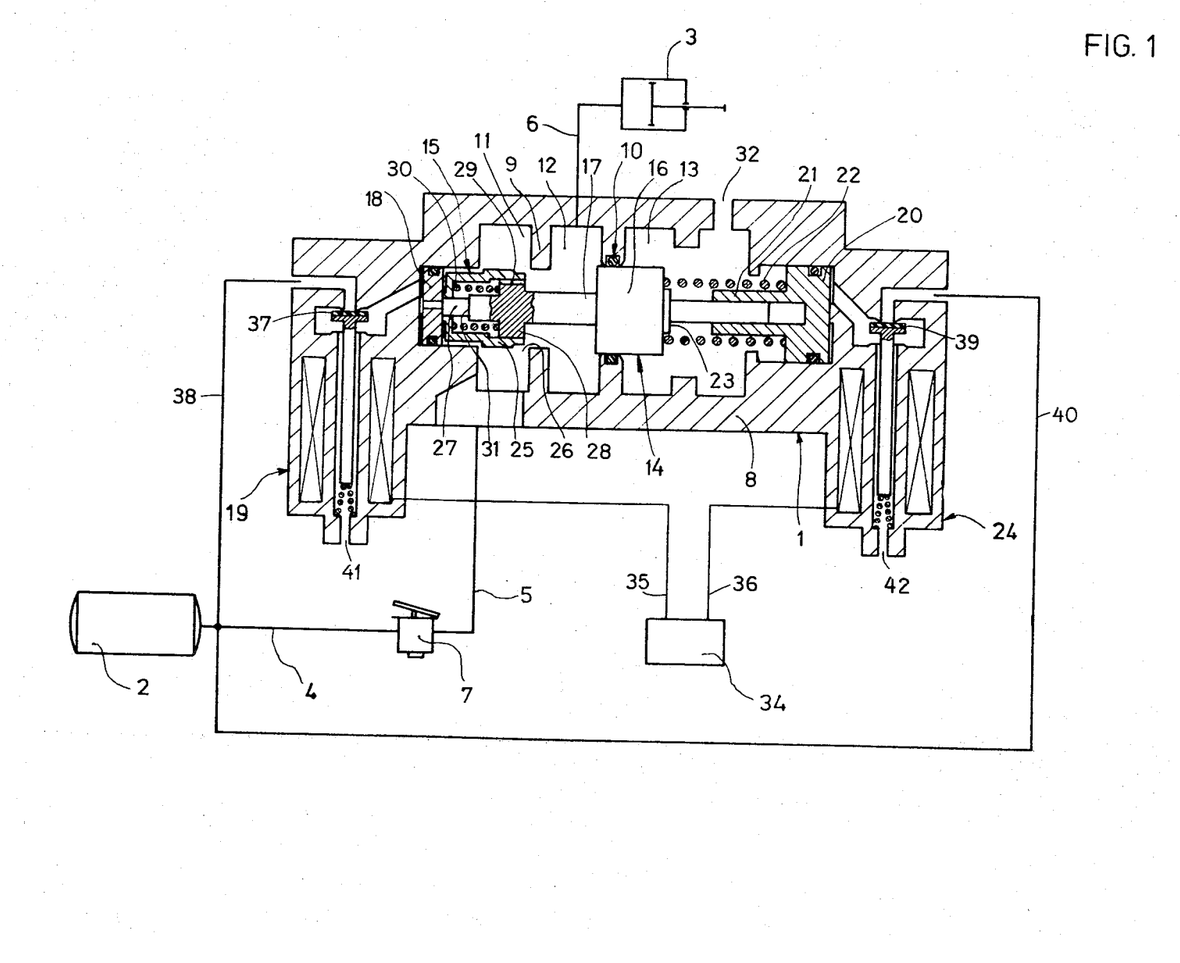
FIG. 1 is a schematic view, partly in section, of an anti-skid apparatus according to one embodiment of the invention including throttle means incorporated in a spool type braking pressure control valve device.

The anti-skid apparatus shown in FIG. 1 comprises a braking pressure spool type control valve device 1 which is interposed in a supply pipe line comprising pipes 4, 5, and 6 leading from a source of fluid under pressure or compressed air tank 2 to a single-acting braking cylinder device 3. A conventional operator's brake valve device 7 is interposed between pipes 4 and 5, and therefore is connected to the braking pressure control valve device 1, said brake valve device being selectively operable to a plurality of positions for effecting supply of fluid pressure from tank 2 at a measured pressure commensurate with the selected position to which the brake valve device is operated. The braking pressure control valve device 1 comprises a valve housing 8 provided with internally axially spaced annular grooves 11, 12, 13 connected by internal coaxial annular lands 9 and 10 axially spaced in said housing between grooves 11 and 12 and between grooves 12 and 13, respectively. A spool type valve assembly 14 comprises an annular vent valve 16, serving as a vent valve member, axially fixed on a valve stem 17 extending coaxially within housing 8, said vent valve being slidably and sealingly operable within land 10. A first operating piston 18 is coaxially fixed on the left-hand end, as viewed in FIG. 1, a valve stem 17 and is operably affected by a magnetic valve device 19. A second operating piston 20 is coaxially disposed in and adjacent the right-hand end of housing 8 and has a pressure area greater than that of operating piston 18, and is provided with a sleeve-like guide portion 21, into which the right-hand end of stem 17 of the valve assembly 14 is slidably accommodated. Valve assembly 14 and operating piston 20 are axially movable relative to one another and have a spring 22 compressed therebetween with one end against valve member 16 and the other end against piston 20, such relative movement being limited by abutment of portion 21 of piston 20 against a shoulder projection 23 formed on the adjacent side of valve 16. Operation of the piston 20 is effected by a magnet valve device 24.

An axially movable throttle assembly 15 comprises a hollow throttle piston 25 having a reduced diameter end portion, which cooperates with land 9 to form a throttle area at 26. The throttle piston 25 is mounted coaxially adjacent the left-hand end of valve stem 17 and is axially movable relative thereto. The left-hand end of throttle piston 25, as viewed in FIG. 1, moves with sliding sealing contact on a reduced diameter end 27 of stem 17, whereas the other end of said throttle piston is slidably supported on an expanded diameter portion 28 of valve stem 17, which has a breather passage 29 formed thereon. A return spring 30 is compressed within throttle piston 25 between portion 28 and the left-hand end of said throttle piston. Relative movement between throttle piston 25 and valve stem 17 is limited in a leftwardly direction by operating piston 18 in the other or rightwardly direction by a shoulder formed on valve stem 17 adjacent expanded portion 28 and against which the throttle piston 25 may abut. The braking pressure control valve device 1 controls communication between the tank 2 and braking cylinder 3 via throttle area 26 in which land 9 acts as a valve seat, and the closing member is the throttle piston 25. An atmospheric communication for venting the braking cylinder 3 to atmosphere is established between pipe 6 and an atmospheric port 32 formed in valve housing 8 when valve 16 is moved righwardly sufficiently to clear land 10.

The magnetic valve devices 19 and 24 are actuated by a conventional wheel-slip detector device 34 which is interposed in and closes or opens respective energizing circuits 35 and 36 of the magnet valves when wheel deceleration or acceleration of a certain value is attained by the wheel.

Figure 2:
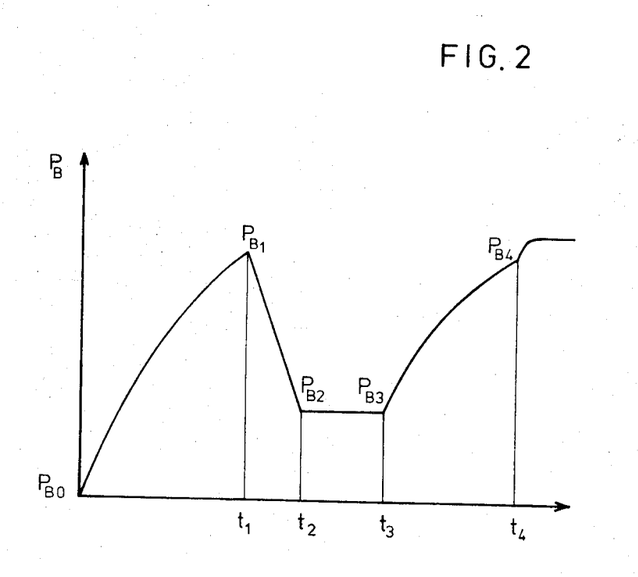
FIG. 2 shows a time-pressure diagram for the antiskid apparatus according to FIG. 1.

Operation of the anti-skid apparatus according to FIG. 1 is described below with reference to the time-pressure diagram as shown in FIG. 2. When the brakes are in a released state, the anti-skid apparatus is in the disposition shown in FIG. 1, in which valve 16 of the braking pressure control valve device 1 is closed, and throttle piston 25 assumes an open or non-throttling position in which throttle area 26 is fully open so that throttling operation is inactive. If a brake application is initiated by actuation of the operator's brake valve 7, tank 2 is connected via pipes 4, 5, and 6, through control valve device 1, to braking cylinder 3, and build-up of braking pressure up to a pressure $P_B$, as represented by the curve $P_{B0}$-$P_{B1}$ (FIG. 2), is initiated in said braking cylinder Assuming that, when the effective braking pressure $P_{B1}$ (time point $t_1$) is reached, the rotary deceleration rate of the wheel exceeds a value leading to skidding of the wheel, that is, at the skid threshold thereof.

In response to a deceleration rate commensurate with the skid threshold of the wheel, detector 34 is operated out of a normal position in which energizing circuits 35 and 36 of the respective magnet valve devices 19 and 24 are open, to a first energizing position in which circuit 35 only is closed for causing magnet valve device 19 to operate a valve 37 therein to an unseated or open position whereby operating piston 18 is subjected to fluid pressure from tank 2 via a pipe 38 and past said unseated valve. Valve assembly 14 is moved rightwardly against spring 22 out of a normal position, in which it is shown and was above which throttle area 26 is into a release position in a closed by throttle piston 25 in a cut-off position and vent valve 16 open. During such rightward movement of valve assembly 14, throttle piston 25 is carried along therewith by means of operating piston 18 which comes into abutment therewith. As a result of this switching of the braking pressure control valve 1, braking pressure in braking cylinder 3 is reduced in accordance with curve $P_{B1}$-$P_{B2}$ shown in FIG. 2, so that rotation of the wheel recovers sufficiently to cause the deceleration rate thereof to fall below the valve of skid threshold when a braking pressure $P_{B2}$ (time point $t_2$) is reached. In response to such rotational recovery of the wheel, detector device 34 is operated to a second energizing position in which energizing circuit 36 of magnetic valve 24 is closed for causing said magnet valve device to operate a valve 39 therein to an unseated or open position in which operating piston 20 is subjected, via a pipe 40 from tank 2, to the same pressure as that acting on operating piston 18. Guide portion 21 of operating piston 20 is brought to rest against the shoulder projection 23 on valve member 16 causing spring 22 to be compressed and consequent movement of the valve assembly to the left against the opposing force of pressure still acting on operating piston 18, so that throttle piston 25 is engaged and carried along therewith by shoulder projection 31, while spring 30 is also compressed. The relative pressure areas of pistons 18 and 20 and the relative compressive ratings of spring 22 and 30 are such that valve assembly 14 is moved leftwardly only to an extent sufficient for closing off vent valve 16 and moving throttle piston 25 to a throttling position in which throttle area 26 is partially open to provide a throttling action on the resumed fluid pressure flow to braking cylinder 3. Thus the braking pressure $P_{B2}$ present in the braking cylinder 3 is still active while the wheel continues to run. As a result, the braking pressure is more efficiently utilized by the wheel during the period of reduced braking pressure restoration thereof.

After the angular speed of the wheel has approximated the linear speed of the vehicle commensurate with the aforementioned specified rotary acceleration of the wheel, detector device 34, in response to such specified rate of acceleration, operates to a first deenergizing position for causing the energizing circuit 35 of magnet valve 19 to be opened again, so that magnet valve 19 resumes a venting position which effects closing of valve 37 and consequent (at time point $t_3$) relief of pressure acting on piston 18 via a vent 41 in said magnet valve device. Compressed spring 20 thus becomes effective to move the valve assembly 14 further to the left until throttle piston 25 is restored to its open position, in which throttle area 26 is fully reopened, and unrestricted flow of braking pressure to cylinder 3, as initially established by the operator's brake valve device 7, is restored. Subsequently, detector device 34 is operated to a second deenergizing position in which circuit 36 is reopened and magnet valve 24 is switched to a venting position in which valve 39 is closed and pressure acting on piston 20 is released via a vent 42 in the magnet valve device. Due to the somewhat delayed operation of magnet valve 24 to its venting position compared to operation of magnet valve 19 to its venting position, a rapid leftward movement of valve assembly 14 to its normal position is positively effected by the higher spring force of compressed spring 20. Throttle area 26 is partially opened to provide throttling action when throttle piston 25 is engaged by shoulder projection 31 and moved to the left, along with leftward movement of valve assembly 14, to a throttling position in which air tank 2 is connected to brake cylinder 3 through the partially closed or restricted throttle area. As a result of such throttling action, throttle piston 25 is subjected on the front or supply side thereof to the full pressure from tank 2, whereas the back or delivery side of said piston subject to the pressure as reduced by the throttling action, so that a resultant or differential force of such pressures is established and directed in opposition to the force of return spring 30.

Return spring 30 is so designed that the force of the pressure differential between the two sides of throttle piston 25 is initially sufficient to overcome the force of the return spring 30 and to thereby hold throttle piston 25 in the throttling position. Restoration of braking pressure in brake cylinder 3, therefore, is retarded according to the effective throttling action as throttle area 26. As a result, the braking force is utilized more efficiently by the wheel during restoration of braking pressure. But if the braking pressure in the brake cylinder 3 reaches a value lying somewhat below the maximum braking pressure $P_{B4}$ (time point $t_4$), then the force of the differential pressure (which is thus reduced by equalizing action between the two sides of piston 25) is overcome by the force of spring 30, and the throttle piston 25 is moved back by spring 30 into a non-throttling position in which throttle area 26 is fully open again and braking pressure in the brake cylinder 3 may rapidly build up again. As a result, the braking force is also utilized more efficiently by the wheel at the end of the restoration phase of the braking pressure. The braking pressure $P_{B4}$ can easily be adjusted by replacing spring 30 with one having the desired compression rating and effect.

Figure 3:
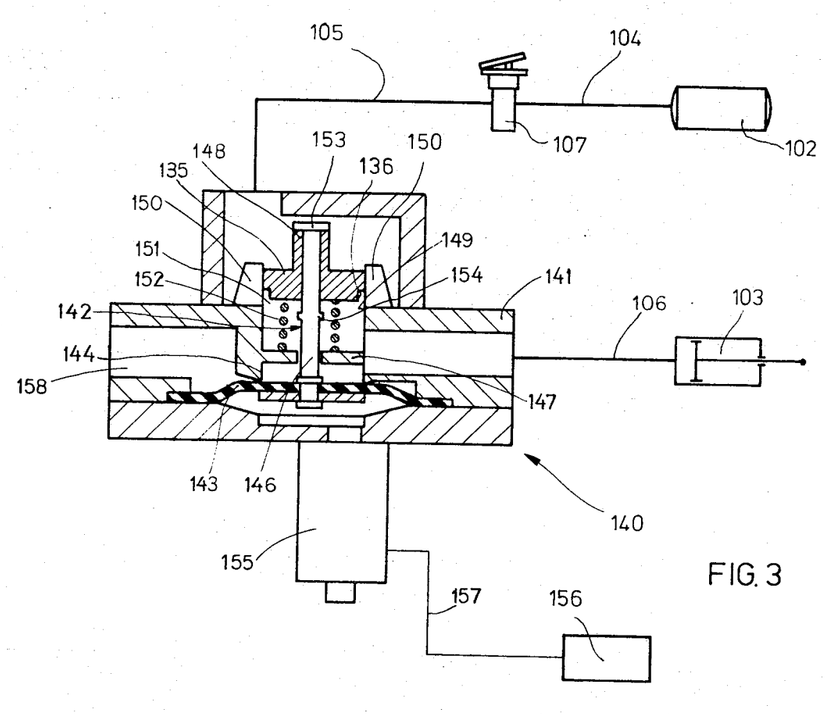
FIG. 3 shows a second embodiment of the anti-skid apparatus according to the invention including throttle means incorporated in a braking pressure control valve device of a combined spool and diaphragm type.

The anti-skid mechanism shown in FIG. 3 differs from the anti-skid apparatus shown in FIG. 1 in that the braking pressure control valve device is somewhat modified.

The anti-skid apparatus shown in FIG. 3, similarly to that shown in FIG. 1, also includes a source of fluid under pressure or compressed air tank 102 communicable with a braking cylinder 103 via pipes 104, 105, and 106. An operator's brake valve device 107, similar to brake valve device 7 described in connection with FIG. 1, is interposed between pipes 104 and 105 for effecting supply of fluid pressure from tank 102 to braking cylinder 103.

A braking pressure control valve device 140 is interposed between pipes 105 and 106 and comprises a valve housing 141, and a valve assembly 142 including an operating piston 143 of the diaphragm type, which cooperates with a valve seat 144 to control venting of air pressure from cylinder 103, said diaphragm piston being concentrically fixed to a lower end, as viewed in FIG. 3, of a valve stem 146 of valve assembly 142. Valve stem 146 is coaxially guided in a bore provided in a guide wall 147 formed in housing 141. A throttle piston 148 having a smaller diameter or reduced portion 136 at the lower end thereof, is slidably operable within a bore 149 formed coaxially in housing 141. The upper end portion of piston stem 146 extends coaxially through throttle piston 148 and is movable relative thereto. The upper portion of bore 149 is formed by a plurality of circularly arranged, angularly spaced, radial fins 150 which cooperate with reduced portion 136 of throttle piston 148 to provide a throttle area 151 controllable by reciprocable movement of said throttle piston within the bore. Throttle area 151 is completely cut off when reduced portion 136 is disposed wholly within the closed portion of bore 149. A return spring 152 is compressedly disposed between guide wall 147 and the lower side of throttle piston 148. The relative movement between throttle piston 148 and piston stem 146 is limited by a shoulder 153 formed at the upper end of said piston stem and a shoulder 154 disposed substantially intermediate the ends of said piston stem, said shoulders serving as stops for the throttle piston 148. Operating piston 143 is subjectable to fluid pressure by operation of magnet valve device 155 which is actuated when a conventional wheel-slip detector device 156 causes an energizing circuit 157 to close or open in response to attainment of a certain wheel deceleration or acceleration values by the wheel.

According to the operation of the anti-skid device shown in FIG. 3, when the brakes are in a released state, the several parts of the anti-skid mechanism are in the respective positions in which they are shown in said FIG. 3. In the brake released disposition of the apparatus, throttle area 151 is fully open and diaphragm piston 143, in the absence of air pressure on the upper side thereof and with air pressure on the lower side thereof (via magnet valve 155), along with upwardly directed force of spring 152 acting thereon through throttle piston 148 and valve stem 146, occupies a supply position in which it is seated on valve seat 144. Consequently, a venting communication between braking cylinder 3 and an atmospheric port 158 formed in housing 141 is closed. The throttle piston 148 thus assumes an open or non-throttling position in which, as above noted, throttle area 151 is fully open.

If a brake application is initiated by actuation of the operator's brake valve 107, and if the wheel deceleration should, as a result thereof, attain a skid threshold value, that is, exceed a value leading to the skidding of the wheel, the detector device 156 responds thereto for effecting energization of magnet valve 155 and consequent release of air pressure on the lower side of piston 143, whereupon supply fluid pressure acting concurrently on the upper side thereof is effective for moving said piston downwardly to an unseated or venting position relative to valve seat 144 and thereby initiates release of air pressure from braking cylinder 3 via port 158. When operating piston 143 is thus moved downwardly, throttle piston 148 is carried along with it by means of shoulder 153, while return spring 152 is being compressed, to a closed or cut-off position in which throttle area 151 is completely closed while braking pressure in the brake cylinder 103 continues to decrease until the deceleration rate of the wheel recovers to a value below the skid threshold. Detector device 156 responds to such deceleration recovery of the wheel and causes magnet valve 155 to be deenergized and circuit 135 opened, so that air pressure is restored on the lower side of piston 143 which is, therefore, moved to its seated position on valve seat 144 to terminate further venting of braking pressure from cylinder 103. As piston 143 continues to move upwardly, valve stem 146 is carried along therewith until shoulder 154 engages throttle piston 148 and moves it into a throttling position in which tank 102 is again connected to the brake cylinder 103 through throttle area 151 to resume supply of fluid pressure to said brake cylinder, but at a throttled rate according to degree to which said throttle area is opened. The throttle piston 148 is held in the established throttling position until it is automatically moved back to its open or non-throttling position at the end of complete restoration of the braking pressure in braking cylinder 103, as already described for the variant shown in FIG. 1.

Figure 4:
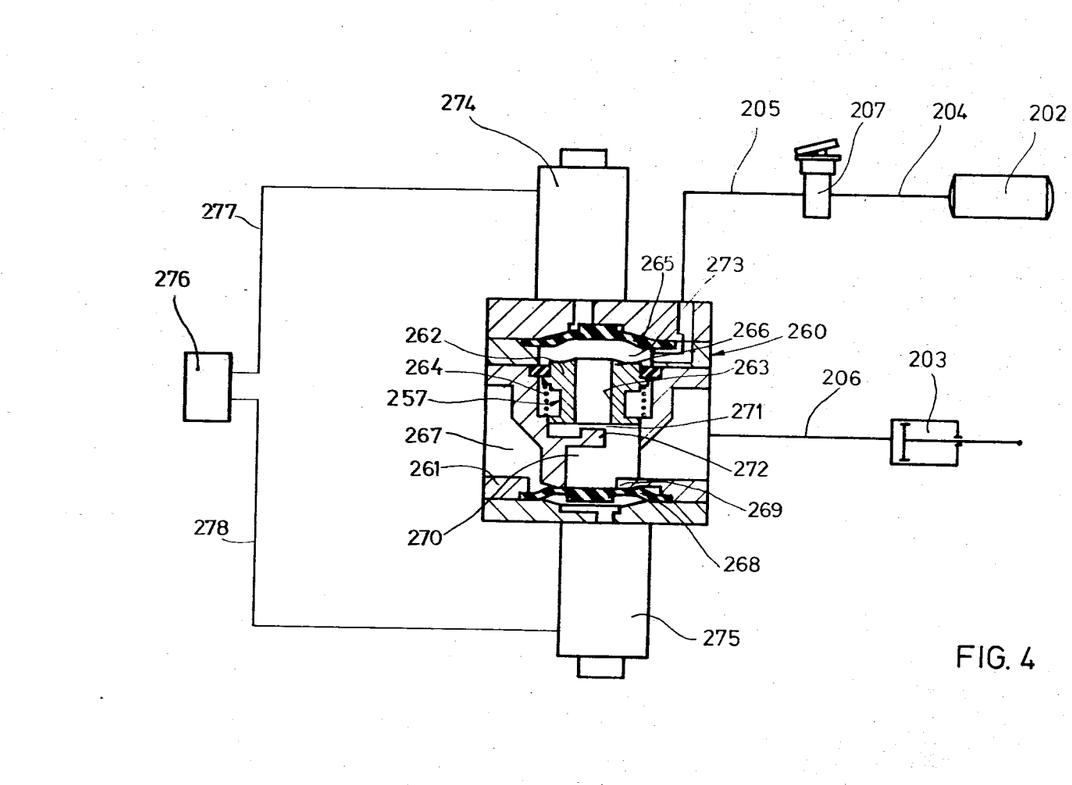
FIG. 4 shows a third embodiment of the anti-skid apparatus according to the invention including throttle means incorporated in a braking pressure control valve device of the diaphragm type only.

The anti-skid mechanism according to FIG. 4 shows a further modification of the braking pressure control valve device and the throttle mechanism included therein.

Similarly to the apparatus shown in FIGS. 1 and 3, the apparatus shown in FIG. 4 also includes a source of fluid under pressure or compressed air tank 202 communicable with a braking cylinder 203 via pipes 204, 205, and 206. An operator's brake valve device 207, also similar to operator's brake valve device 7 shown in FIG. 1, is interposed between pipes 204 and 205 for effecting supply of air pressure from tank 202 to braking cylinder 203. A braking pressure control valve device 260 is interposed between pipes 205 and 206 and comprises a housing 261 having operably disposed therein a throttle assembly 257 comprising a throttle piston 262 having an axial bore 263 extending coaxially therethrough. Upward movement of throttle piston 262, as viewed in FIG. 4, is urged by a spring 264, such upward movement being limited by engagement of a shoulder formed on the piston with a stop ring fixed in housing 261. The braking pressure control valve device 260 also comprises a first diaphragm type operating piston 265 which, in cooperation with a valve seat 266 surrounding the upper end of bore 263 in throttle piston 262 forms a fluid pressure admission valve, and a second diaphragm type operating piston 268 which, in cooperation with a valve seat 269 surrounding one end of a passageway 270 formed in housing 261 and connecting with pipe 206, forms a vent valve by which venting of fluid pressure from braking cylinder 203 via a vent port 267 is controlled.

The lower end of bore 263 in throttle piston 262 cooperates with a compatibly disposed housing shoulder 272 formed in housing 261 to provide a throttle area 271 and, therefore, throttling action for fluid pressure supplied to braking cylinder 3. A supply chamber 273 disposed adjacent the lower side of diaphragm piston 265 is connected to pipe 205. Operating pistons 265 and 268 are each actuable by magnet valve devices 274 and 275, respectively. Magnetic valve devices 274 and 275 are energizable by a conventional wheel-slip detector device 276, which closes or opens respective circuits 277 and 278 of the magnet valves when certain wheel deceleration or acceleration values are attained by the wheel.

In operation of the anti-skid apparatus shown in FIG. 4, when the brakes are in a released state, the several parts of the anti-skid mechanism are in the respective portions in which they are shown and in which diaphragm piston 265 is in an unseated position relative to valve seat 266, while diaphragm piston 268, due to the force of fluid pressure acting on the lower side thereof (via magnet valve 275) is in a seated position relative to valve seat 269. With throttle piston 262 in its fully unseated position, there is no throttling action at throttle area 271 between the lower end of said piston and shoulder 272. If a brake application is initiated by actuation of the operator's brake valve 207, the wheel deceleration attains a skid threshold, that is, exceeds the value leading to skidding of the wheel, the detector device 276, in response thereto, causes operation of magnet valve device 274 to admit fluid pressure on the upper side of piston 265 and operation of magnet valve device 275 to release fluid pressure from the under or lower side of piston 268. Consequently, piston 265 is moved downwardly to a seated position on valve seat 266, as a result of which supply of fluid pressure to brake cylinder 203 is terminated and throttle piston 262 is brought into a throttling position while compressing the return spring 264. Diaphragm piston 268, as above noted, is simultaneously relieved of fluid pressure acting on the lower side thereof and, as a result of the braking pressure acting on the upper side thereof, is moved downwardly to an unseated position relative to valve seat 269 resulting in release of braking pressure from brake cylinder 203, until the rotary deceleration of the wheel falls below the value leading to skidding.

When wheel deceleration value falls below the value leading to skidding, the detector 276 again responds to cause magnet valve devices 274 and 275 to be switched back to their initial position whereby piston 265 is operated to its unseated position again and piston 268 to its seated position. The throttle piston 262, now in its throttling position, is subjected on the upper or supply side to pressure in chamber 273 and on the lower or delivery side to pressure prevailing in braking cylinder 3, thus establishing a pressure differential therebetween, the resulting force of which is opposingly directed against the force of the return spring 264. Thus, throttle piston 262 is held in its throttling position, so that restoration of braking pressure in the brake cylinder 203 is delayed according to the throttling action established. The throttle piston is automatically restored to its non-throttling position upon termination of restoration of braking pressure, as already described for the embodiment according to FIG. 1.

Figure 5:
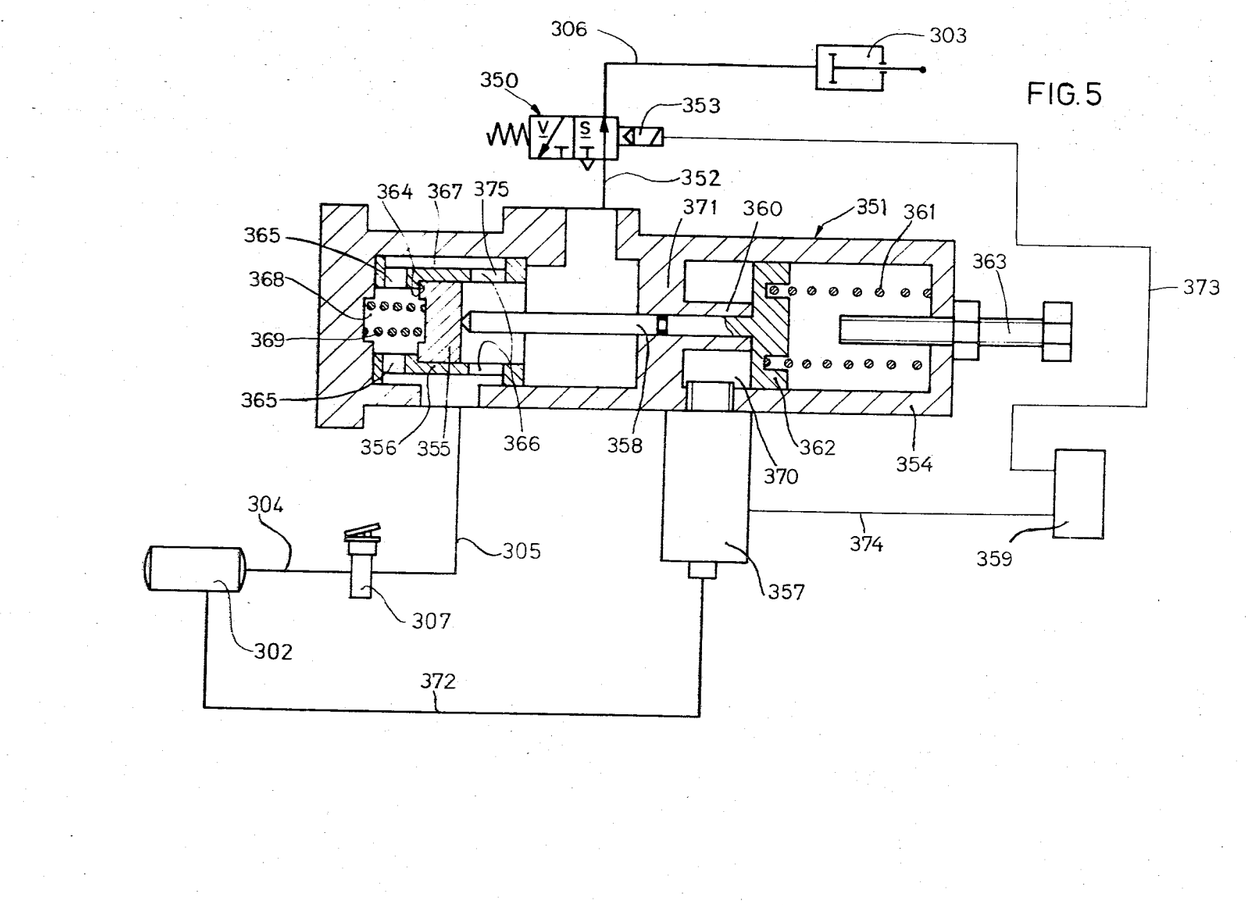
FIG. 5 shows a fourth embodiment of the anti-skid apparatus according to the invention including throttle means formed as a separate device disposed outside the structural limits of the control valve device.

The anti-skid apparatus shown in FIG. 5 differs from the anti-skid apparatus shown in FIG. 1 in that throttle means included therein comprises a device separate from the braking or pressure control valve device.

The anti-skid apparatus shown in FIG. 5 also comprises a fluid pressure or compressed air tank 302 communicable with a braking cylinder 303 via pipes 304, 305, and 306. An operator's brake valve device 307, also similar to the operator's brake valve 7 shown in FIG. 1, is interposed between pipes 304 and 305 for effecting supply of air pressure from tank 302 to braking cylinder 303.

A solenoid-operated braking pressure control valve device 350 is connected serially with a throttle valve device 351 by a pipe 352, said control valve device, throttle valve device, and pipe 352 all being interposed in serial relation to each other between pipes 305 and 306. The braking pressure control valve device 350 includes a piston (not shown) actuated by pressure medium under the control of a solenoid 353. The throttle valve device 351 comprises a valve housing 354 and a throttle piston 355 serving as a movable throttle member, which is sealingly reciprocably operable within a sleeve 356 coaxially fixed adjacent the left-hand end of said housing, as viewed in FIG. 5. A valve stem 358 is axially operable within a guide sleeve 360 formed coaxially within housing 354 substantially intermediate the ends thereof. The left-hand end of stem 358 rests against the adjacent inner face of throttle piston 355 with the other end thereof rigidly fixed to an operating piston 362 which is capable of movement against the opposing force of a return spring 361 compressed between said operating piston and the right-hand end wall of housing 354. Movement of piston 362 is limited in a leftwardly direction by abutment of said piston against the adjacent end of guide sleeve 360 and in a rightwardly direction by abutment with the inner end of an adjustable stop screw 363 extending inwardly and coaxially into housing 354 through the right-hand end wall of said housing.

Sleeve 356 is provided with an internal shoulder 364 serving as a stop for leftward movement of throttle piston 355 and is also provided with axially spaced pluralities of radial openings 365 and 366. Pipe 305 is connected to an annular supply chamber 367 surrounding sleeve 356 in housing 354 and thence via openings 365 to a spring chamber 368, in which a spring 369 is disposed for urging throttle piston 355 in a rightwardly direction. Pipe 305 is also communicable with pipe 352 via supply chamber 367 and openings 366. A control chamber 370 is formed in housing 354 between an inner separating wall 371 and the left-hand side of piston 362, and is chargeable with and relieved of operating pressure by a magnet valve 357 connected to tank 302 via a pipe 372.

Solenoid valve 353 and magnet valve 357 are energizable and deenergizable by a conventional wheel-slip detector device 359, which closes or opens respective circuits 373 and 374 when certain wheel deceleration or acceleration values are attained by the wheel.

In operation of the anti-skid apparatus shown in FIG. 5, when the brakes are in a released state, the several parts thereof are in the respective positions shown in which fluid pressure is completely vented from control chamber 370 and throttle piston 355 is urged by spring 361, through piston 362 and stem 358, against stop 364 while compressing spring 369. Pipe 305 is connected to brake cylinder 303 via chamber 367, openings 366, pipe 352, braking pressure control valve device 350, and pipe 306. If a brake application is initiated by actuation of the operator's brake valve device 307, the throttle piston 355 is subjected on both sides, via chamber 367 and openings 365 and 366, with the same pressure from tank 302 and is thereby held in an open or non-throttling position in which it is shown, while braking pressure may build up unrestrictedly in brake cylinder 303.

If the wheel deceleration at this time exceeds a value leading to the skidding of the wheel, detector device 359 responds to such condition of deceleration to cause, in the usual manner, actuation of solenoid and magnet valve devices 353 and 357, respectively. Braking pressure control valve 350 is shifted from a supply position, indicated S in the drawing, in which air pressure may be supplied to brake cylinder 303, to a vent position, indicated V in the drawing, for interrupting the connection between the pipes 352 and 306, and venting pressure from said brake cylinder. Simultaneously, magnet valve device 357 causes air pressure to be admitted into chamber 370, which results in effecting rightward movement of piston 362 and consequent compression of spring 361 until said piston comes to rest against the inner end of stop screw 363. Since stem 358 moves to the right along with piston 362, spring 369 is effective in moving throttle piston 355 to the right until it assumes a throttling position in which openings 366 are partially blocked by said piston, so that pipes 305 and 352 are now connected through a throttle area 375 formed cooperatively by the throttle piston 355 and openings 366 in sleeve 356.

After the wheel, as a result of braking pressure reduction, obtains the approximate linear speed of the vehicle, if the acceleration of the wheel again exceeds a certain value, detector device 369 responds again to cause solenoid valve 353 and magnet valve 357 to be operated to their respective initial positions. Braking pressure control valve 350 is operated to position S, thereby reestablishing connection between pipes 352 and 306, and air pressure in chamber 370 is again vented by operation of magnet valve device 357, so that the force of spring 361 again becomes active on throttle piston 355 via piston 362 and stem 358. Throttle piston 355 remains in the throttling position, however, because the combined forces of spring 368 and the resultant force of pressure differential caused by pressures on front and back sides of the throttle piston 355 are sufficient for overcoming the force of compressed spring 361 until braking pressure in brake cylinder 303 has been restored to the point where such pressure differential is sufficiently neutralized to render the force of spring 361 effective for overcoming the said combined forces and moving throttle piston 355 back into the non-throttling position.

Figure 6:
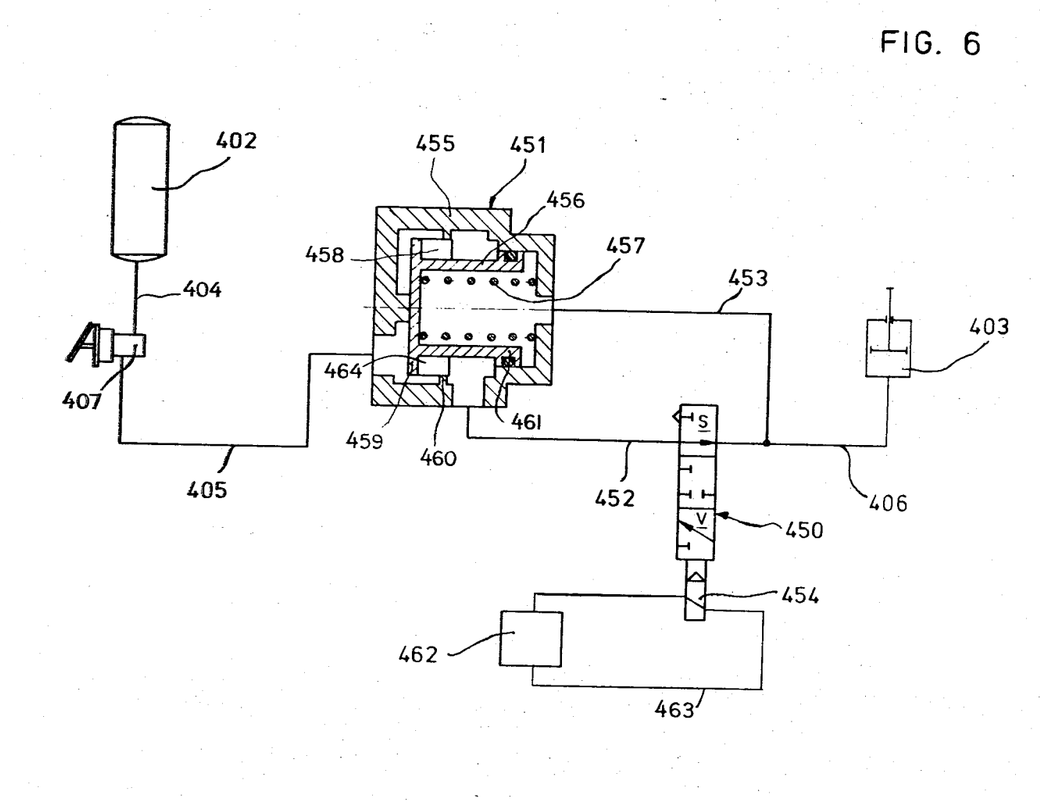
FIG. 6 shows a fifth embodiment of the anti-skid apparatus according to the invention including throttle means actuable responsively to braking pressure.

The anti-skid apparatus shown in FIG. 6 differs from the anti-skid apparatus shown in FIG. 1 essentially in that the throttle means can be switched pneumatically into the throttling position by the braking pressure control valve simultaneously with initiation of braking pressure reduction.

The anti-skid apparatus shown in FIG. 6 also comprises a source of fluid under pressure or compressed air tank 402 communicable with a braking cylinder 403 via pipes 404, 405, and 406. An operator's brake valve device 407, also similar to the operator's brake valve device 7 shown in FIG. 1, is interposed between pipes 404 and 405 for effecting supply of air pressure from tank 402 to braking cylinder 403.

In addition to a symbolically illustrated braking pressure control valve device 450 of the solenoid-operated type, the anti-skid apparatus also comprises a throttle valve device 451 which is interposed between pipe 406, via which it is connected to braking cylinder 403, and a pipe 452, via which it is connected to said throttle valve device. Throttle valve device 451 is also connected to pipe 406 via a pipe 452 in bypassing relation to control valve device 450. The braking pressure control valve device 450 includes pressure operable piston means (not shown) which is operable under the control of a solenoid 454.

The throttle valve device 451 comprises a housing 455 and a movable throttle piston 456 biased in a leftwardly direction, as viewed in the drawing, by a return spring 457 and guided in said housing by a plurality of angularly spaced radial ribs 458 formed on the periphery thereof. The left-hand end of throttle member 456 forms a throttle plate or piston 459 which, in cooperation with an annular shoulder 460, formed coaxially in housing 455, provides the throttling action, said shoulder serving also as the guide member in which ribs 458 are slidably disposed. Throttle piston 456 is subjectable to fluid pressure on the left or supply side thereof via pipe 405 and on the right or delivery side thereof via pipe 453.

Solenoid 454 is actuable by means of a conventional wheel-slip detector device 462 which closes or opens an energizing circuit 463 for said solenoid when specified wheel deceleration or acceleration values, respectively, are attained by the wheel.

In operation of the anti-skid apparatus shown in FIG. 6, when the brakes are in a released state, the several parts of the anti-skid apparatus are in the respective positions shown in which throttle piston 456 is held by return spring 457 in an open or non-throttling position, in which a throttle area 464 formed between the throttle plate 459 and shoulder 460 is fully open, and pipeline 405 is connected to brake cylinder 403 via said throttle area, pipeline 452, braking pressure control valve device 450, and pipeline 406. In the brake-release disposition of the apparatus, control valve 450 occupies a supply position, indicated S in the drawing, in which pipe 452 is in communication with pipe 406.

If a brake application is initiated by actuation of the brake valve 407, throttle piston 456 is, at the onset, subject to the same degree of fluid pressure from tank 402 on the left or supply side through pipe 405 and on the right or delivery side through the fully open throttle area 464, pipe 452, control valve 450, and pipe 453, so that said throttle piston is retained in its non-throttling position by return spring 457, while the braking pressure builds up in the brake cylinder 403. If the wheel deceleration at this time exceeds a specified value which indicates that the skid threshold has been reached, detector device 462 responds thereto to close circuit 463 and effect energization of solenoid 454. As a consequence, the braking pressure control valve 450 is switched from position S to a vent position, indicated V in FIG. 6, in which braking pressure in brake cylinder 403 is reduced via pipe 406 while pipe 452 is cut off from pipe 406. The pressure in pipe 453 is also released at this time via control valve 450, while the pressure in pipe 405 is maintained. The throttle piston 466 is thus relieved of fluid pressure acting on the right side thereof and moved into a throttling position against the opposing force of spring 457 only, in which throttling position the throttle area between the throttle plate 459 and shoulder 460 is reduced to produce a throttling effect. The throttling action of throttle plate 459 establishes a pressure differential between the opposite sides of said plate which initially is sufficient for overcoming the opposing force of return spring 457 and retaining said throttle plate in the throttling position for a delayed period of time.

Since the remaining manner of operation of the anti-skid apparatus shown in FIG. 6, and especially of the throttle valve device 451 is similar to the already described manner of operation of the embodiment shown in FIG. 1 and should be evident to one skilled in the art, further description of such remaining operation is not deemed essential to an understanding of the invention. The anti-skid apparatus, according to the invention, is also characterized by simplicity of construction. Moreover, the invention provides the further advantage, when the brakes are released via braking valve 407, of immediately causing the throttle means to be switched to its non-throttling position due to the drop in the braking pressure, so that no brake releasing difficulties can occur.

We claim:

1. Anti-skid apparatus for a vehicle wheel comprising:
   a. brake applying means operable responsively to fluid pressure for applying a braking force to the wheel commensurate with the degree of fluid pressure supplied thereto;
   b. fluid pressure supply means including a source of fluid under pressure and an operator's brake valve device selectively operable to a plurality of supply positions for effecting supply of fluid pressure from said source to said brake applying means at a measured pressure determined by the position to which the operator's brake valve device is operated for causing deceleration of the wheel at a rate normally commensurate with said measured pressure;
   c. braking pressure control means interposed between said brake applying means and said fluid pressure supply means and having a normal position in which unrestricted flow of fluid pressure supply to the brake applying means, at said measured pressure, is effected, said braking pressure control means being operable to a different position in which interruption of braking pressure supply to the brake applying means and reduction of such braking pressure therefrom to atmosphere is effected; and
   d. wheel slip detector means operable responsively to wheel deceleration at a certain rate, at which the skid threshold of the wheel is reached, to a first disposition for effecting operation of said braking pressure control means to its said different position, and being operable responsively to restoration of wheel deceleration to a rate compatible with that of linear deceleration of the vehicle to a second disposition for effecting restoration of said braking pressure control means to its said normal position;

wherein the improvement comprises:
   e. a throttle piston disposed in said braking pressure control means in the flow path of fluid pressure supplied to the brake applying means, said throttle piston having an open position in which said unrestricted flow of pressure supply is effected and being operable, by initial movement of the braking pressure control means from its said different position toward its said normal position, to a throttling position in which said reduction of braking pressure from the brake applying means is terminated, and restoration of the braking pressure control means to its said normal position and, consequently, restoration of braking pressure to said measured pressure is delayed according to a predetermined rate.

2. Anti-skid apparatus, as set forth in claim 1, wherein said throttle piston assumes a cut-off position in the said different position of the braking pressure control means for effecting said interruption of braking pressure supply to the brake applying means.

3. Anti-skid apparatus for a vehicle wheel, as set forth in claim 1, wherein said wheel slip detector means is also operable, subsequently to operation of said braking pressure control means to its said different position and responsively to consequent restoration of wheel rotation to a rate below that corresponding to the wheel skid threshold, to a third disposition for effecting operation of the braking pressure control means and said throttle piston to the throttling position.

4. Anti-skid apparatus, as set forth in claim 3, wherein the braking pressure control means comprises:
   a. differential piston means; and
   b. valve means operable responsively to operation of said wheel slip detector means to its said first, second, and third dispositions to cause operation of said differential piston means for effecting operation of the braking pressure control means to said different, normal, and throttling positions, respectively.

5. Anti-skid apparatus, as set forth in claim 4, wherein the wheel slip detector means comprises an electrical wheel slip detector device and said valve means comprises electrically operable magnet valve means.

6. Anti-skid apparatus, as set forth in claim 3, wherein said braking pressure control means comprises a valve assembly including:
  a. a valve stem;
  b. a first operating piston fixed at one end of said valve stem and subjectable to fluid pressure from said source by operation of said wheel slip detector means to its said first disposition for operating the braking pressure control means to its said different position;
  c. a second operating piston having a larger pressure area than said first operating piston and carried at the opposite end of said valve stem in operably opposing relation to said first operating piston and with limited axial movement relative to the valve stem, said second operating piston being subjectable to fluid pressure from said source, by operation of said wheel slip detector means to its said third disposition, and being operable responsively to said fluid pressure for overcoming opposing fluid pressure acting on said first operating piston and effecting operation of the valve assembly and said throttle piston to said throttling position; and
  d. a vent valve member fixed on said valve stem in such an axial position as to occupy a closed position, in which communication between said brake applying means and atmosphere is cut off, in both the normal and throttling positions of the braking pressure control means, and an open position in which said communication is open in the different position of the braking pressure control means;
  e. said throttle piston being carried on said valve stem adjacent said first operating piston and having limited axial movement relative to the valve stem for effecting said interruption and for throttling said supply of fluid pressure to the brake applying means in the different position and the throttling position, respectively, of the braking pressure control means.

7. Anti-skid apparatus, as set forth in claim 6, wherein said first and second operating pistons are of the diaphragm type.

8. Anti-skid apparatus, as set forth in claim 6, wherein said valve assembly further comprises:
  a. first biasing means acting on said first operating piston through said throttle piston in opposition to the fluid pressure acting on said first operating piston; and
  b. second biasing means acting on said second operating piston in opposition to the fluid pressure acting thereon, said first and second biasing means being of such calibration and acting cooperatively with the opposing fluid pressures acting on the respective operating pistons as to maintain said valve assembly and the throttle piston in said throttling position until said measured pressure has been restored in the brake applying means and the braking pressure control means has been restored to its said normal position.

9. Anti-skid apparatus, as set forth in claim 2, wherein said braking pressure control means comprises:
  a. a valve stem having said throttle piston mounted at one end thereof with limited axial movement relative thereto;
  b. compressible biasing means for urging said throttle piston to an open position against said one end of the valve stem and in which said unrestricted flow of fluid pressure supply to the brake applying means is effected; and
  c. a diaphragm type operating piston fixed to the opposite end of said valve stem, normally subjectable to equal fluid pressures on opposite sides thereof, and being operable by said biasing means, acting through said throttle piston and said valve stem, to a supply position for effecting operation of the braking pressure control means to its said normal position, said operating piston being operable, responsively to reduction of fluid pressure from one side thereof by said wheel slip detector means in its said first disposition, to a venting position for effecting operation of the braking pressure control means to its said different position in which said throttle piston initially assumes its said throttling position,
  d. said throttle piston, in said throttling position, being subject to a pressure differential established thereacross by fluid at said measured pressure acting on one side thereof and pressure prevailing in said brake applying means acting on the opposite side thereof, subsequently to operation of the braking pressure control means to its said different position, said pressure differential being effective for maintaining said throttle piston in its said throttling position until pressure acting on the opposite side thereof has been restored to said measured pressure.

10. Anti-skid apparatus, as set forth in claim 2, wherein said braking pressure control means comprises:
  a. a control valve device including biasing means for operating said control valve device to a supply position, in which fluid pressure supply to the brake applying means is effected, and being operable, responsively to operation of said wheel slip detector means to its said first disposition, to a venting position in which said interruption of braking pressure supply to and reduction thereof from the brake applying means is effected;
  an operating piston fixed at one end of a valve stem and having one side thereof subjectable to fluid pressure by operation of the wheel slip detector means to its said first disposition and relieved of such pressure in the second disposition of said wheel slip detector means, the other end of said valve stem making abutting contact with one side of said throttle piston;
  first biasing means acting on the opposite side of said operating piston for biasing said throttle piston, through the operating piston and the valve stem, to its said open position; and
  d. second biasing means acting on the opposite side of said throttle piston and effective upon pressurization of said one side of the operating piston and consequent neutralization of the biasing effect of said first biasing means, for operating the throttle piston to its said throttling position,
  e. said throttle piston being restorable to its said open position by said first biasing means and said control valve device being restorable to its said supply position responsively to operation of the wheel slip detector means to its said second disposition.

11. Anti-skid apparatus, as set forth in claim 2, wherein said braking pressure control means comprises:

a. a control valve device normally occupying a supply position in which said unrestricted flow of fluid pressure supply to the brake applying means is effected, and being operable, responsively to operation of said wheel slip detector means to its said first disposition, to a venting position in which said interruption of braking pressure to and reduction thereof from the brake applying means is effected; and b. biasing means acting on one side of said throttle piston for urging the throttle piston toward its said open position, said throttle piston being subject on the opposite side to fluid at said measured pressure and on said one side to the fluid pressure prevailing in the brake applying means, c. said throttle piston being operable to its said throttling position responsively to reduction of fluid pressure acting on said one side as effected by operation of said control valve device to its said venting position and being subject, in said throttling position, to a pressure differential thereacross established by the respective fluid pressures acting on the opposite sides of the throttle piston, said pressure differential being effective for delaying restoration of braking pressure in the brake applying means to said measured pressure for a predetermined period subsequently to restoration of said control valve device to its said supply position.

\* \* \* \* \*